(12) United States Patent
Kuzuu et al.

(10) Patent No.: US 6,332,715 B1
(45) Date of Patent: Dec. 25, 2001

(54) BEARING DEVICE

(75) Inventors: Takashi Kuzuu; Takao Morimoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,764

(22) PCT Filed: Sep. 29, 1998

(86) PCT No.: PCT/JP98/04384

§ 371 Date: May 19, 2000

§ 102(e) Date: May 19, 2000

(87) PCT Pub. No.: WO00/19118

PCT Pub. Date: Jun. 4, 2000

(51) Int. Cl.⁷ ............................. F16C 13/02; F16C 43/02
(52) U.S. Cl. .......................... 384/276; 384/295; 384/419
(58) Field of Search .................... 384/215, 220, 384/222, 275, 276, 280, 281, 295–300, 416, 418, 419, 428, 627

(56) References Cited

U.S. PATENT DOCUMENTS

| | | | |
|---|---|---|---|
| 2,724,867 | * 11/1955 | Smith | 384/418 X |
| 3,297,223 | * 1/1967 | Bueker | 384/215 X |
| 3,751,122 | * 8/1973 | Dubay | 384/296 |
| 3,994,542 | * 11/1976 | Wojdyla | 384/215 X |
| 5,845,947 | * 12/1998 | Arabia, Jr. et al. | 384/428 X |
| 6,142,292 | * 11/2000 | Patterson | 384/295 X |

FOREIGN PATENT DOCUMENTS

| | | | |
|---|---|---|---|
| 03103614-A | * 4/1991 | (JP) | 384/428 |
| 5-87125 | 4/1993 | (JP) . | |
| 6-300034 | 10/1994 | (JP) . | |
| 8-212654 | 8/1996 | (JP) . | |

\* cited by examiner

*Primary Examiner*—Thomas R. Hannon
(74) *Attorney, Agent, or Firm*—Sughrue, Mion, Zinn, Macpeak & Seas, PLLC

(57) ABSTRACT

The bearing device comprises a bearing 4, a washer 5 and a coupling piece 6 that couples the bearing 4 to the washer 5 and/or separates itself from the washer 5 and the bearing 4 by a pressure force applied thereto, wherein the bearing, the washer and the coupling piece are integrally formed with each other, and the base flap 7 is formed with a projection 7b. Due to this construction, an operator can easily hold the bearing 4 and the washer 5 as one component, and as the coupling piece 6 can be readily removed by the projection 7b, a working efficiency for installing this device can be drastically improved, and the automated mounting operation thereof can also be easily implemented.

3 Claims, 11 Drawing Sheets

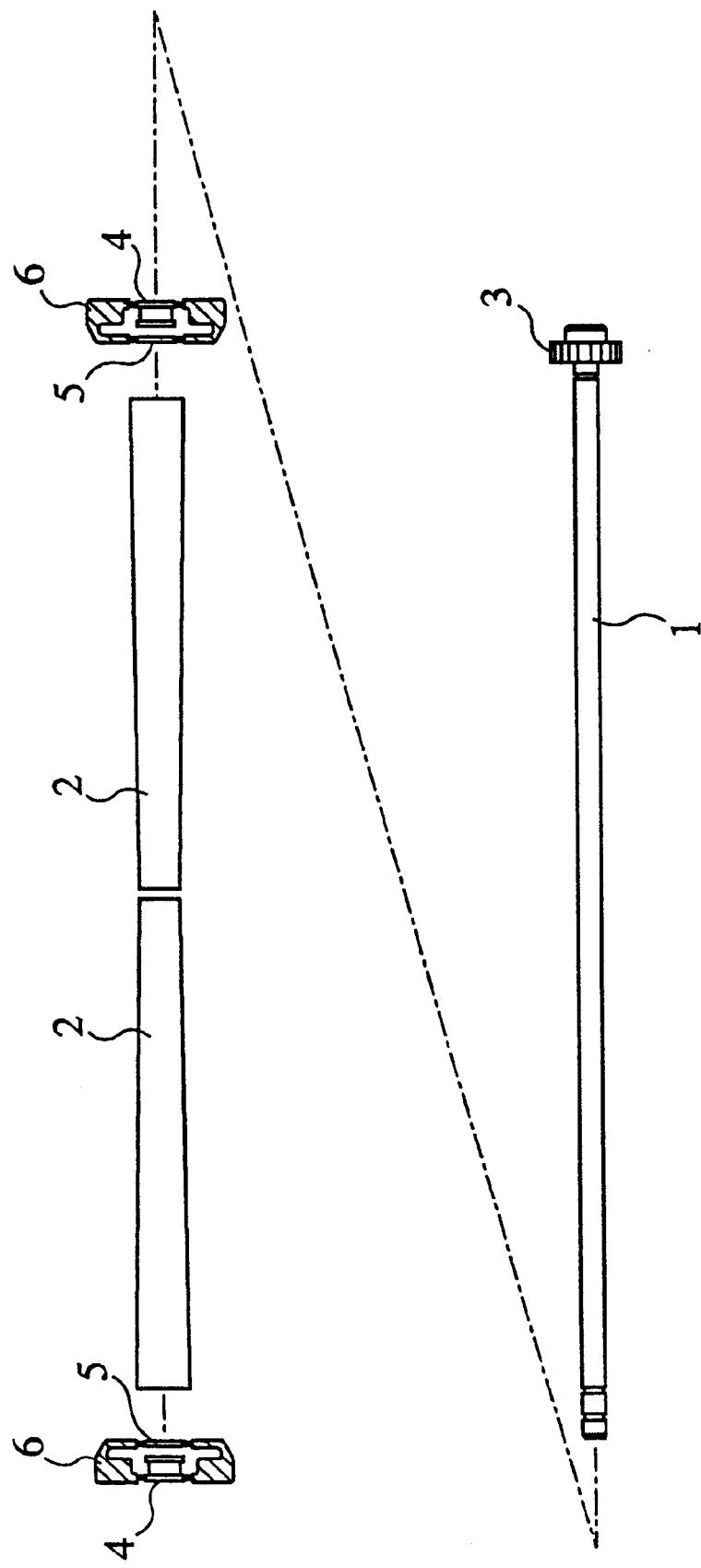

BEARING DEVICE

BACKGROUND OF THE INVENTION

1. Technical Field

The present invention relates to a bearing device composed of a bearing and a washer integrally formed with each other, which can be readily loaded to a shaft and its fitting operation can be greatly facilitated.

2. Background Art

Conventionally, as one example of a small electronic device provided with a bearing component such as a bearing, there has been provided so far a disk player for reading out data recorded on an optical disk or the like. The disk player is provided with a disk loading device for carrying the optical disk into and/or out of the disk player, and is further provided with a carriage roller for sending the optical disk to a predetermined location.

The bearing device for use in a disk loading device is explained below, by taking up a carriage roller provided in the loading device as an example. FIG. 16 is a front view of a carriage roller to which a conventional bearing device is attached, FIG. 17 is an exploded perspective view showing the state in which neither a bearing nor a gear is attached to the carriage roller, FIG. 18 is an exploded perspective view showing the state in which both a bearing and a gear are attached to a carriage roller, FIG. 19 is a magnified front view of an end portion of a carriage roller and FIG. 20 is an exploded perspective view of a carriage roller and a base flap.

In these figures, reference numeral 11 denotes a shaft, 11a denotes a stepped portion, 12 denotes a rubber roller for carrying a disc-shape recording medium such as an optical disk (not shown) to a predetermined location, and is integrally formed with the shaft 11, 13 denotes a bearing secured to the shaft 11, the shifting movement thereof toward the rubber roller 12 being limited by the stepped portion 11a. Further, numeral 14 denotes a gear that is pressure-inserted to be fixed to the end portion of the shaft 11, numeral 15 denotes a base flap for rotatably supporting the shaft 11, and numeral 15a denotes a bearing-holder recess for holding the bearing 13.

The operation of the conventional bearing device is as follows.

As shown in FIG. 20, by engageably inserting the bearing 13 attached to the shaft 11 into the bearing-holder recess 15a, the shaft 11 is rotatably supported by the base flap 15.

Since the conventional bearing device is constructed as such, in order that the bearing 13 is not brought into contact with the rubber roller 12, the shaft 11 has to be formed with the stepped portion 11a and the rubber roller 12 has to be integrally formed with the shaft 11, and because of this construction, there has been such a problem that the fabrication thereof requires much labor and the total cost is thereby raised.

For solving this problem, there has been provided so far a carriage roller, in which the rubber roller is not integrally formed with the shaft but is formed as an individually different component, and the shaft is inserted into the rubber roller. The carriage roller constructed as such is further formed with a washer between the bearing 13 and the rubber roller for preventing the rubber roller from shifting in the axial direction of the shaft and brought into contact with the bearing 13.

However, as both the bearing 13 and the washer explained above are made thin and small, the problem still remains that the installation of these components to the shaft is rather difficult, and that the installation itself cannot be readily automated.

The present invention has been proposed to solve the problems aforementioned, and it is an object of the present invention to provide a bearing device, which can be easily mounted to the shaft and the automation of its mounting operation can also be readily implemented.

DISCLOSURE OF THE INVENTION

In order to achieve the above object, the bearing device according to the present invention is constructed in such a manner as to comprise: a bearing fitted to a shaft, a washer fitted to the shaft at the close proximity to the bearing, a coupling piece for coupling the bearing and the washer, and also separating itself from the washer and the bearing by an applied pressure force, wherein the bearing, the washer and the coupling piece are integrally formed with each other.

Due to this construction, an operator can easily hold the bearing and the washer as one component, and the coupling piece can be readily removed by applying a predetermined pressure force thereto, so that a working efficiency for installing this device can be drastically improved, and the automated mounting operation thereof can also be easily implemented. Further, the washer and the bearing are prevented from being lost during the mounting operation of the bearing device.

The bearing device according to the present invention further comprises a projection provided at the close proximity to the bearing holding recess.

Due to this, the coupling piece is severed by applying a pressure force to one part of the coupling piece when fitting the bearing to the bearing holding recess, so that the coupling piece can be readily removed, and the working efficiency for installing this device can thereby be drastically improved,.

The bearing device according to the present invention further comprises a projection formed on the inner surface of its shaft insertion hole of the bearing, and the shaft is formed with a fitting groove for fitting and primarily fixing the projection to the groove.

Due to this, the bearing device can be readily shifted or carried to another location as an attachment provided to a carriage roller.

BRIEF DESCRIPTION OF THE DRAWINGS

FIG. 3 is an exploded front view showing the assembling state in which a rubber roller and a bearing device are mounted to the shaft.

BEST MODE FOR CARRYING OUT THE INVENTION

Several embodiments for carrying out best the present invention are now explained with reference to attached drawings, in order to explain the present invention to details.
[First Embodiment]

Figure 1:
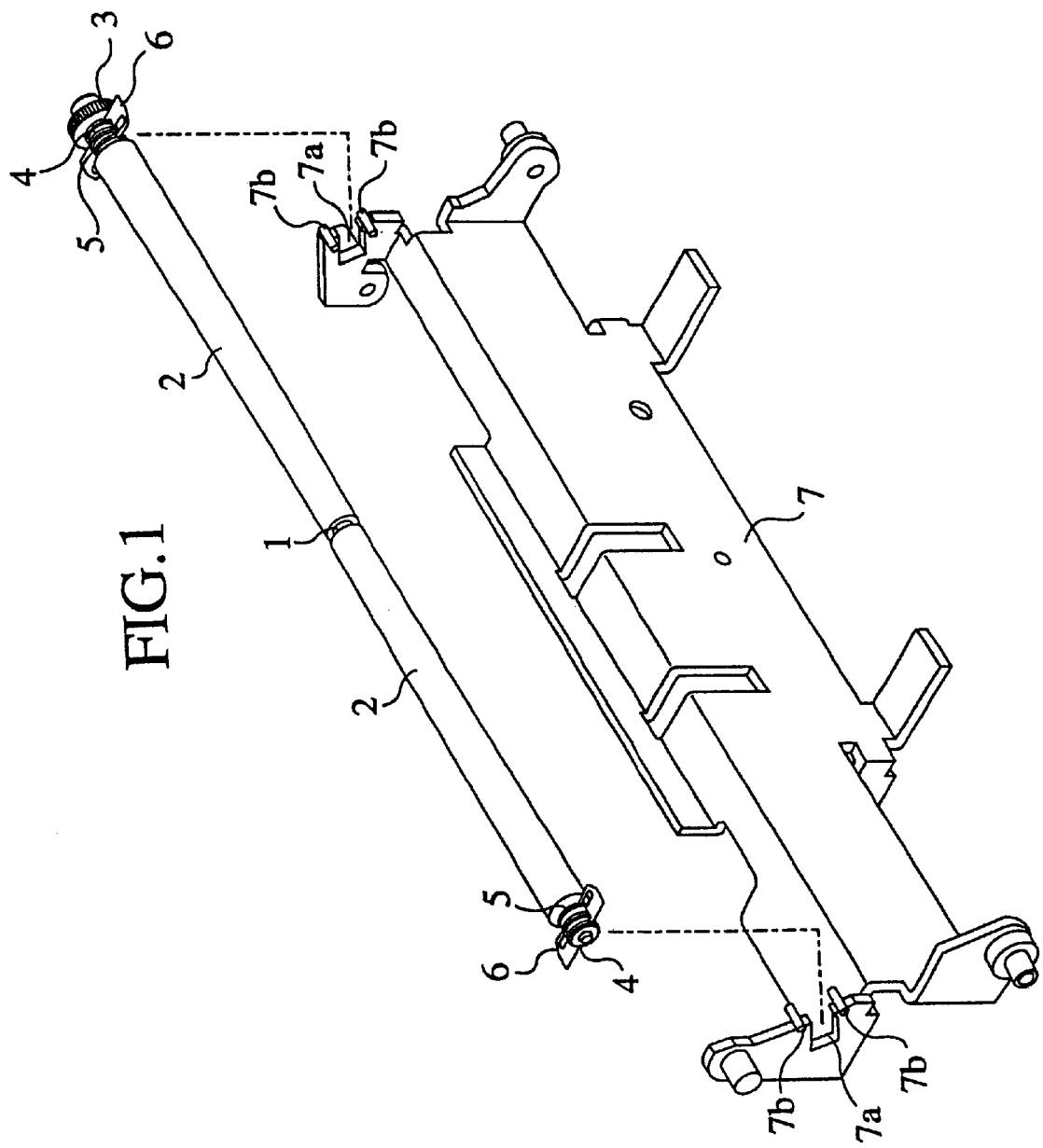
FIG. 1 is an exploded perspective view showing a carriage roller to which a bearing device according to a first embodiment of the present invention is applied.
Figure 2:
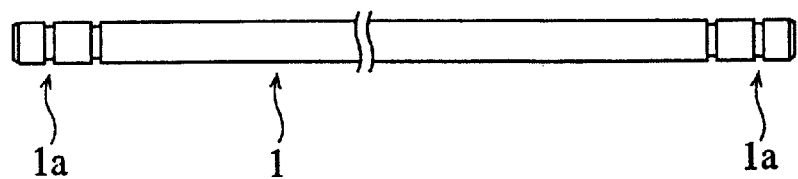
FIG. 2 is a front view of a shaft.
Figure 4:
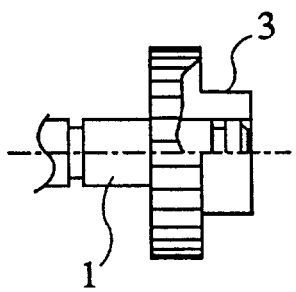
FIG. 4 is a partly sectional view of a gear fixed to the shaft.
Figure 5:
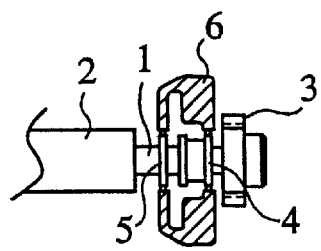
FIG. 5 is a front view of the bearing device mounted to one end of the shaft.
Figure 6:
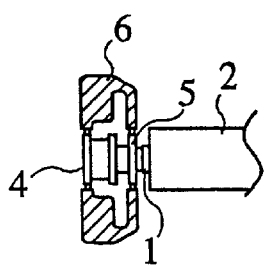
FIG. 6 is a front view of the bearing device mounted to the other end of the shaft.
Figure 7:
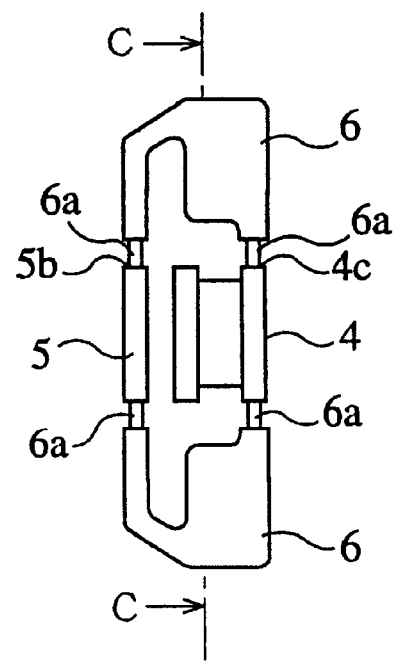
FIG. 7 is a front view of the bearing device.
Figure 8:
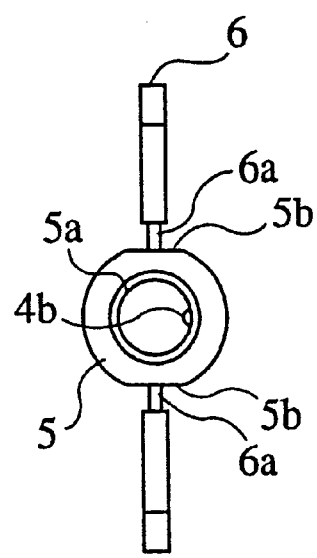
FIG. 8 is a left-side view of the bearing device shown in FIG. 7.
Figure 9:
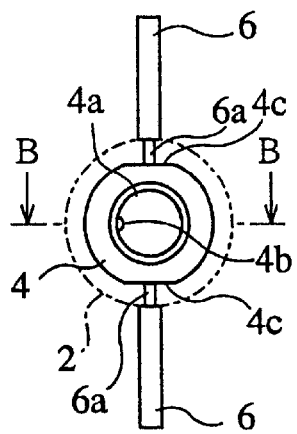
FIG. 9 is a right-side view of the bearing device shown in FIG. 7.
Figure 10:
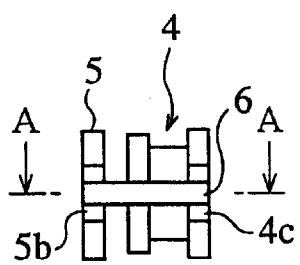
FIG. 10 is a plain view of the bearing device shown in FIG. 7.
Figure 11:
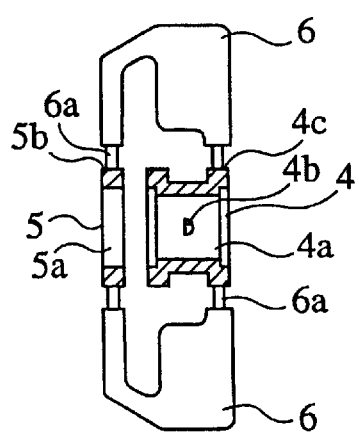
FIG. 11 is a sectional view of the bearing device shown in FIG. 10 cut along the line A—A.
Figure 12:
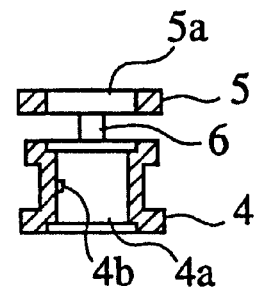
FIG. 12 is a sectional view of the bearing device shown in FIG. 9 cut along the line B—B.
Figure 13:
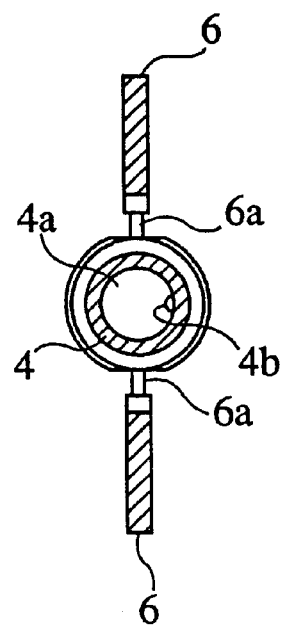
FIG. 13 is a sectional view of the bearing device shown in FIG. 7 cut along the line C—C.
Figure 14:
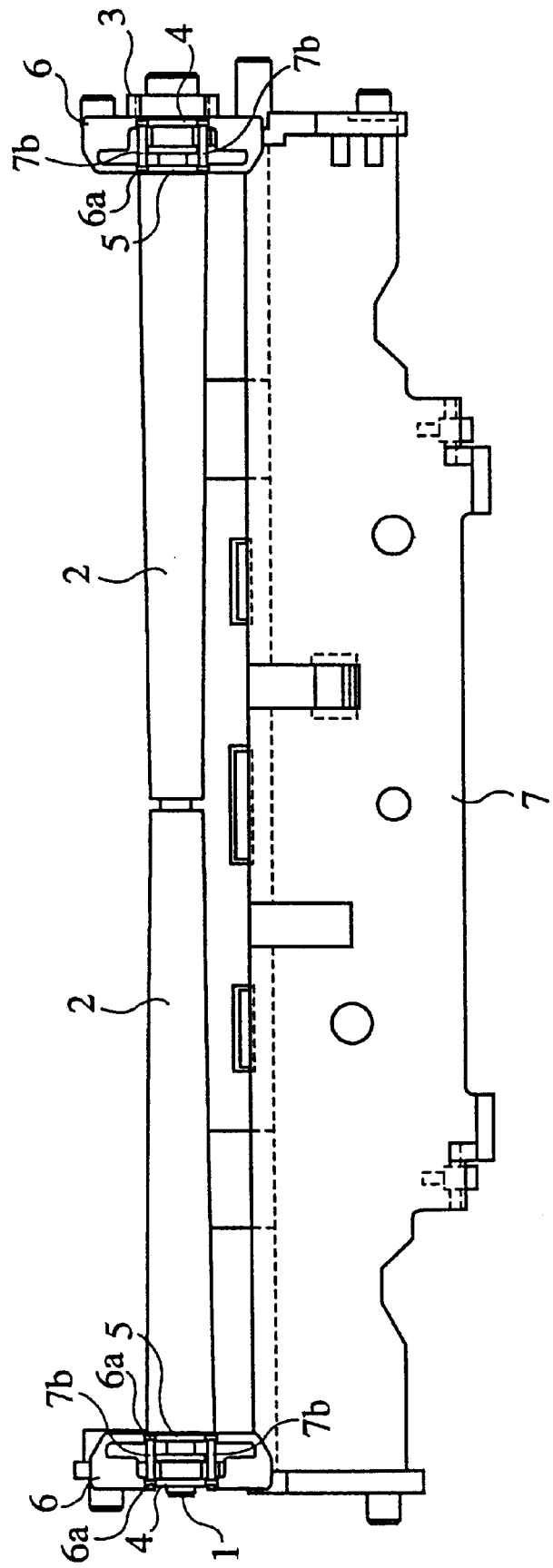
FIG. 14 is a front view showing the state just before the shaft fitted having the bearing device mounted thereto is set to a base flap.

FIG. 1 is an exploded perspective view showing a carriage roller to which a bearing device according to a first embodiment of the present invention is applied, FIG. 2 is a front view of a shaft, FIG. 3 is an exploded front view showing the assembling state in which a rubber roller and a bearing device are mounted to the shaft, FIG. 4 is a partly sectional view of a gear fixed to the shaft, FIG. 5 is a front view of the bearing device mounted to one end of the shaft, FIG. 6 is a front view of the bearing device mounted to the other end of the shaft, FIG. 7 is a front view of the bearing device, FIG. 8 is a left-side view of the bearing device shown in FIG. 7, FIG. 9 is a right-side view of the bearing device shown in FIG. 7, FIG. 10 is a plain view of the bearing device shown in FIG. 7, FIG. 11 is a sectional view of the bearing device shown in FIG. 10 cut along the line A—A, FIG. 12 is a sectional view of the bearing device shown in FIG. 9 cut along the line B—B, FIG. 13 is a sectional view of the bearing device shown in FIG. 7 cut along the line C—C, FIG. 14 is a front view showing the state just before the shaft fitted having the bearing device mounted thereto is set to a base flap, FIGS. 15A to 15D are side views showing altogether the procedure for separating and removing a coupling piece from the bearing device In these figures, reference numeral 1 denotes a metal-made shaft, 1a denotes a primary fixing groove for fitting the bearing thereto, 2 denotes a rubber roller which is formed separately from the shaft 1 in such a manner that the shaft 1 can be inserted thereto, and comes in contact with an optical disk having a disc-shape recording medium (not shown) when the optical disk is carried thereby. This rubber roller 2 is slidably mounted to the shaft 1 in the axial direction of the shaft.

Reference numeral 3 denotes a gear fitted to the shaft 1 by pressure-inserting one end of the shaft 1 thereto, and composes one part of the loading mechanism of a disk loading device not shown.

Reference numeral 4 denotes a bearing to be fitted to the primary fixing groove 1a, 5 denotes a washer which is disposed between the bearing 4 and the rubber roller 2 to avoid friction resistance generated by the contact between the bearing 4 and the rubber roller 2, 6 denotes a coupling piece for coupling the bearing 4 and the washer 5, wherein the bearing 4, the washer 5 and the coupling piece 6 are all integrally molded by resin material.

These components are explained into details with reference to FIGS. 7 to 13. In the figures, reference numeral 4a is a shaft insertion hole that allows insertion of the shaft thereto, and numeral 4b denotes a projection formed on the inner wall of the shaft insertion hole 4a to be fitted with the primary fixing groove 1a of the shaft 1. Reference numeral 4c denotes a flat portion, 5a denotes a shaft insertion hole to which the shaft 1 is inserted, and 5b denotes a flat portion.

Reference numeral 6a denotes a connecting portion for linking the flat portion 4c of the bearing 4 and the flat portion 5b of the washer 5, and is made so thin that it can be severed by a predetermined pressure. Further, the length of the protrusions of this connecting portion 6a respectively projecting from the flat portions 4a and 5b are made in such a manner as not to exceed the external diameter of the rubber roller 2 as indicated by a long-and-short dash line shown in FIG. 9. The flat portions 4c, 5b and the connecting portion 6a are made as such, so as to reduce the length of the rest of the protrusion of the connecting portion 6a projecting toward the flat portions 4c and 5b after the connecting portion 6a is severed.

Further, as shown in FIG. 1, reference numeral 7 denotes a base flap (shaft holding member) for rotatably holding the shaft 1, and is fixed to the chassis of a disk loading device not shown. Reference numeral 7a denotes a bearing-holder recess for holding the bearing 4 fitted to the shaft 1, whose inner diameter at the nearby area of its opening is made in such a manner that the bearing 4 can be engageably inserted. Numeral 7b denotes a projection formed near the bearing-holder recess 7a, and it exists for applying a predetermined pressure to the connecting portion 6a of the coupling piece 6 when the bearing 4 is engageably inserted into the recess 7a. That is, this projection 7b is disposed in the nearby area of the bearing-holder recess 7a, and is protrudedly formed at a location where it can be abutted to the connecting portion 6a when the bearing 4 is engageably inserted.

The operation of the bearing device according to the present invention is as follows.

Figure 15A:
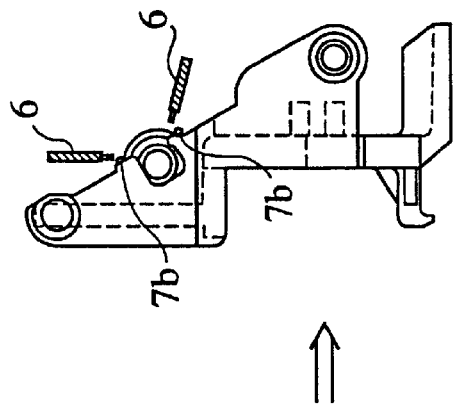
FIGS. 15A to 15D are side views showing altogether the procedure for separating and removing a coupling piece from the bearing device
Figure 15B:
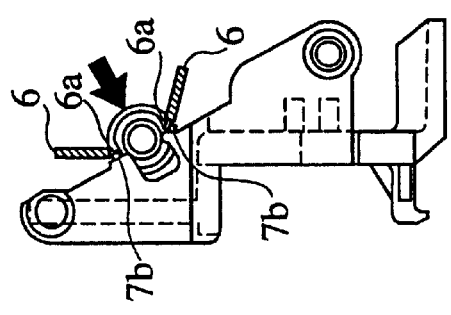

As shown in FIGS. 14, 15A and 15B, first, the bearing 4 fitted to the shaft 1 is disposed at a location facing the bearing-holder recess 7a of the base flap 7.

Figure 15C:
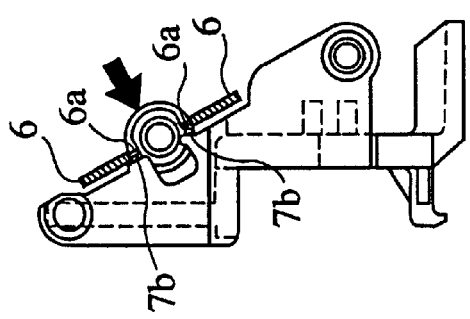
Figure 15D:
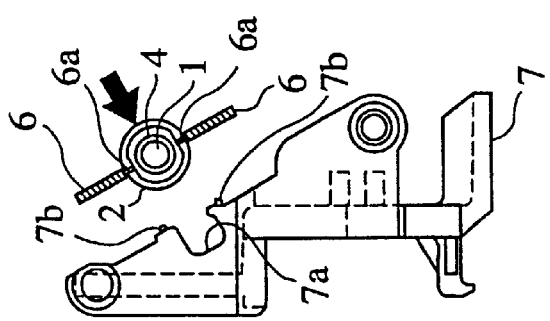
Figure 16:
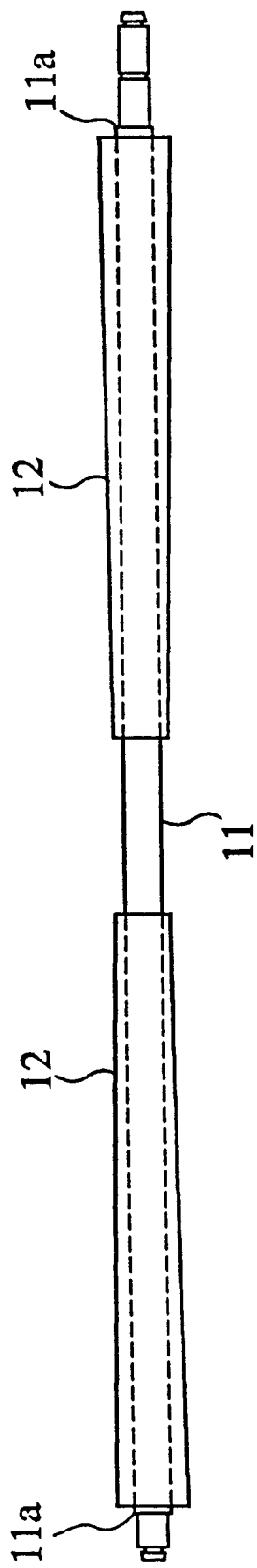
FIG. 16 is a front view of a carriage roller provided with a conventional bearing device.
Figure 17:
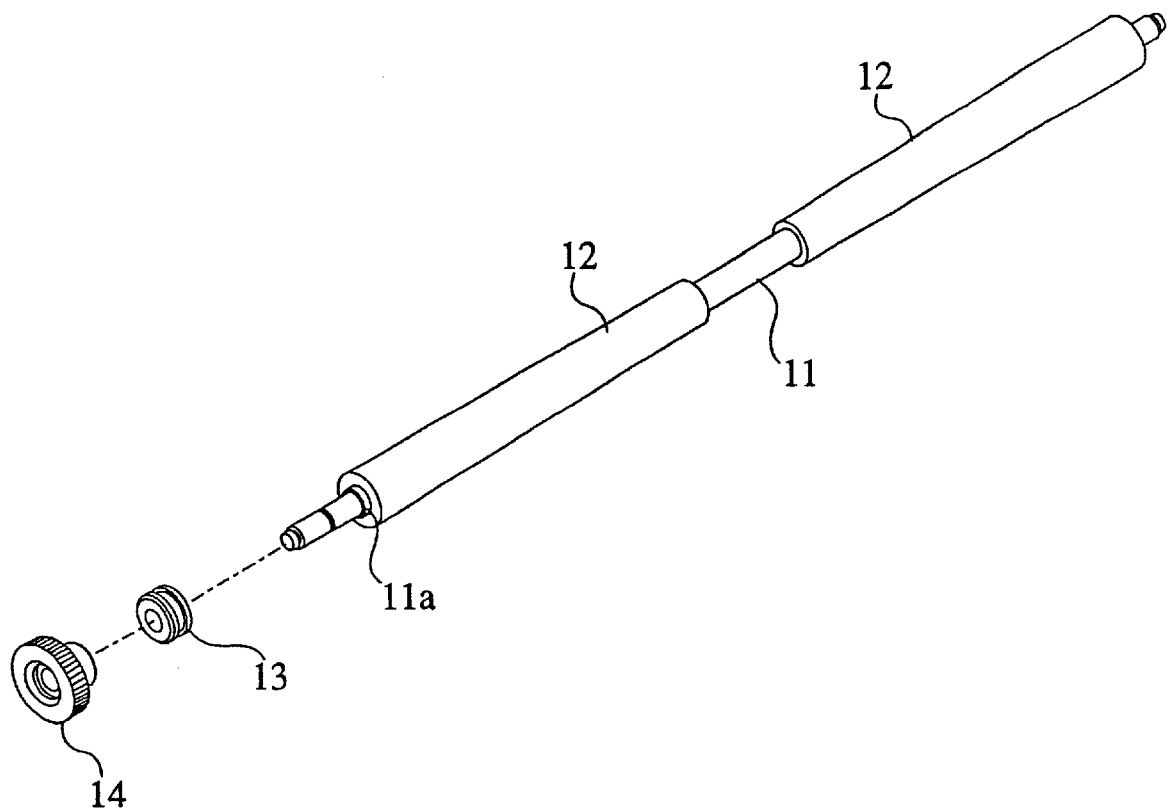
FIG. 17 is an exploded perspective view showing the state just before the bearing and the gear are mounted to the carriage roller.
Figure 18:
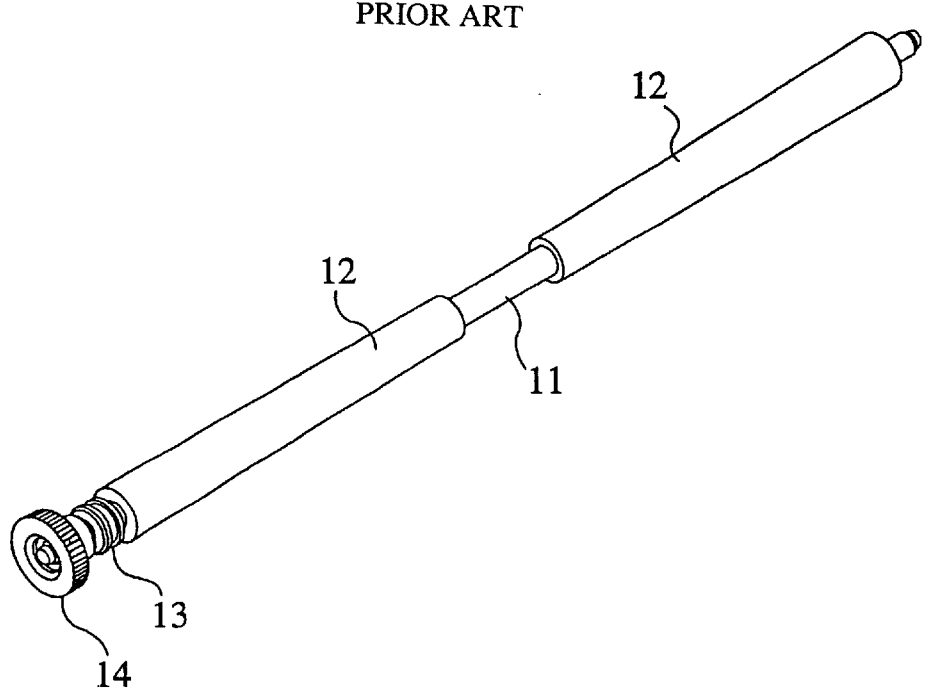
FIG. 18 is an exploded perspective view showing the state immediately after the bearing and the gear are mounted to the carriage roller.
Figure 19:
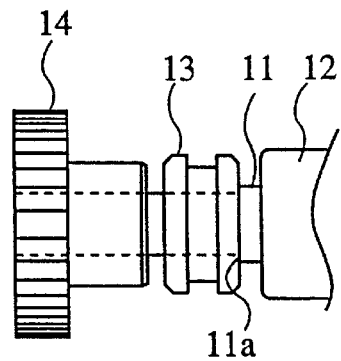
FIG. 19 is a magnified view of an end portion of the carriage roller.
Figure 20:
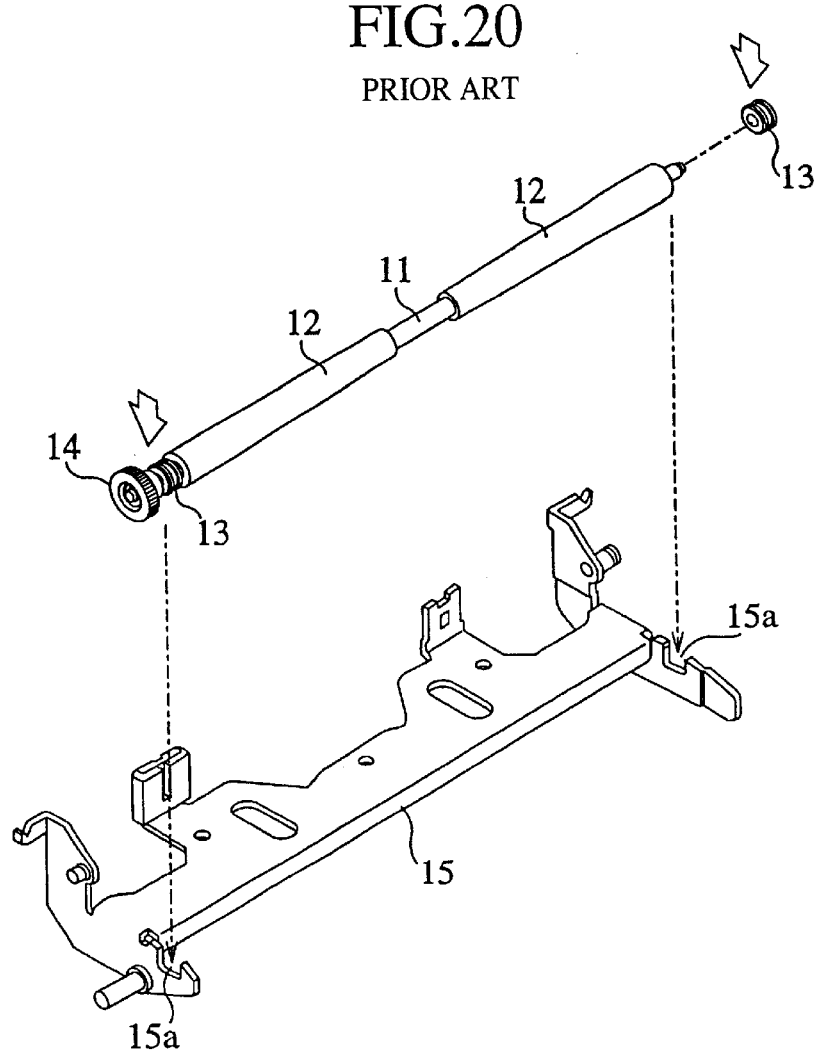
FIG. 20 is an exploded perspective view of the carriage roller and the base flap.

Thereafter, by applying a predetermined pressure in the direction indicated by a black arrow within FIGS. 15A to 15D, the bearing 4 is engageably inserted into the recess 7a. On this occasion, since the connecting portion 6a is abutted to the projection 7b and receiving a predetermined pressure applied thereto, the coupling piece 6 is gradually bent as shown in FIG. 15C, and finally when the coupling piece 6 is severed as shown in FIG. 15D, it is separated from the bearing 4 and the washer 5. That is, since the coupling piece 6 can be readily and quickly separated and removed when disposing the shaft 1 on the base flap 7, the entire operation can be completed quite easily.

As explained heretofore, according to the first embodiment of the present invention, since the operator can easily handle the bearing 4 and the washer 5 which are integrally formed with each other by the coupling piece 6, his working efficiency can be greatly improved, and the mounting operation as a whole can be easily automated. Further, since the coupling piece 6 can be easily removed when the shaft 1 is placed on the base flap 7, the working efficiency is further improved.

It should be noted that the first embodiment of the present invention has been explained as to the case where the projection 7b is disposed on the base flap. However, the application of the present invention is not limited to this, but even if the projection 7b is mounted in a jig for disposing the base flap in a predetermined location, the same effects can be obtained. Still further, the structure of each of the bearing 4, the washer 5, the coupling piece 6, and of the projection 7b can be variably changed, and is not limited to those shown in the figures.

Still further, the first embodiment of the present invention has been explained as to the case where the present invention is applied to a carriage roller of a disk loading device. However, the application of the present invention is not limited to this, but it can be applied to any device requiring a small-type bearing device, obtaining the same effects as those obtained in the present embodiment.

INDUSTRIAL APPLICABILITY

As explained heretofore, the bearing device of the present invention is suitable to any device that requires a small-type bearing device, and requires also an improvement in the working efficiency for its mounting operation and a automation of its mounting operation.

What is claimed is:

1. A bearing device comprising:

a bearing fitted to a shaft, a washer fitted to said shaft at the close proximity to said bearing, a coupling piece for coupling said bearing and said washer, and also separating itself from said washer and said bearing by an applied pressure force, wherein said bearing, said washer and said coupling piece are integrally formed with each other.

2. A bearing device according to claim 1 further comprising a shaft holding member formed with a bearing holding recess for holding said bearing fitted to said shaft, and a projection provided at the close proximity to said bearing holding recess for severing said coupling piece by applying a pressure force to one part of said coupling piece when mounting said bearing to said bearing holding recess.

3. A bearing device according to claim 1, wherein said bearing is formed with a projection on the inner surface of its shaft-insertion hole, and said shaft is formed with a fitting groove for fitting and primarily fixing said projection to said groove.

* * * * *